US006334972B1

(12) United States Patent
Kim

(10) Patent No.: US 6,334,972 B1
(45) Date of Patent: Jan. 1, 2002

(54) METHOD FOR FORMING A RESIN MOLDING FOR A COIL OF A TRANSFORMER

(75) Inventor: Cheol-Jin Kim, Suwon (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/616,976

(22) Filed: Jul. 14, 2000

(30) Foreign Application Priority Data

Jul. 26, 1999 (KR) ........................................... 99-30304

(51) Int. Cl.[7] .......................... B29C 45/14; B29C 70/70

(52) U.S. Cl. ............... 264/263; 264/272.19; 264/272.2; 29/605; 29/606

(58) Field of Search ....................... 264/272.11, 272.15, 264/272.19, 272.2, 275, 278, 263; 29/602.1, 605, 606

(56) References Cited

U.S. PATENT DOCUMENTS

| | | | | |
|---|---|---|---|---|
| 2,956,312 A | * 10/1960 | Naimer | .................. | 264/272.19 |
| 3,268,645 A | * 8/1966 | Stampfli | ................ | 264/272.19 |
| 3,626,051 A | * 12/1971 | Liautaud | ..................... | 264/275 |
| 3,811,045 A | * 5/1974 | Turner et al. | ............... | 264/250 |
| 4,337,219 A | * 6/1982 | Falkowski et al. | ..... | 264/272.19 |
| 4,725,395 A | * 2/1988 | Gasparaitis et al. | .......... | 29/856 |
| 5,317,300 A | * 5/1994 | Boesel | ........................ | 29/606 |
| 5,497,136 A | * 3/1996 | Wall | ........................... | 335/299 |
| 5,524,334 A | * 6/1996 | Boesel | ........................ | 29/605 |
| 5,596,797 A | * 1/1997 | Bumsted | ...................... | 29/601 |
| 5,659,246 A | * 8/1997 | Togo et al. | ................ | 29/602.1 |

* cited by examiner

*Primary Examiner*—Angela Ortiz
(74) *Attorney, Agent, or Firm*—Robert E. Bushnell, Esq.

(57) ABSTRACT

A method for forming a resin molding on a coil of a transformer is disclosed. The method comprises the steps of inserting a coil into an auxiliary spacing apparatus, inserting the auxiliary spacing apparatus into a mold, and forming a resin molding for the auxiliary spacing apparatus with the coil by putting a resin into the mold. According to the methods, the coil is not damaged and a resin molding is formed with an uniform thickness.

23 Claims, 8 Drawing Sheets

METHOD FOR FORMING A RESIN MOLDING FOR A COIL OF A TRANSFORMER

CLAIM OF PRIORITY

This application makes reference to, incorporates the same herein, and claims all benefits accruing under 35 U.S.C. §119 from an application for Resin Molding Method For A Coil Used In A Transformer Of A Microwave Oven earlier filed in the Korean Industrial Property Office on Jul. 26, 1999 and there duly assigned Ser. No. 30304/1999.

FIELD OF THE INVENTION

The present invention relates to a transformer, and more particularly to a method for forming a resin molding on a coil of a transformer.

DESCRIPTION OF THE RELATED ART

Generally, since a high voltage is applied to the coil, a coil used in the transformer of a microwave oven is insulated electrically by an insulating paper or a resin molding. FIG. 1 is an analyzed perspective view for illustrating a method for forming a resin molding for a coil for electrically insulating the coil used in the transformer of the microwave oven in the related art.FIG. 2 is a perspective view for showing the coil covered with a resin molding formed by using the method of FIG. 1.

Referring to the resin molding method for the coil used in the transformer, as shown in FIG. 1, the coil 11 is inserted into a cavity 16 of a metal mold, and then a resin is injected to the coil 11 to form a resin molding 21 on the coil 11 as shown in FIG. 2. In FIG. 1, a reference numeral 12 denotes a connector for drawing out terminal ends from the coil 11. The connector 12 may be connected to the coil 11 for drawing out terminal ends from the coil 11 as shown in FIG. 1, or only two pieces of lines may be drawn out from the coil 11, although such is not shown in the drawings.

The resin molding 21 formed on the coil 11 is required to have a uniform thickness for a good insulation. When the thickness of the resin molding 21 is not uniform, the device can be damaged due to an insulation breaking. Therefore, a plurality of spacing projections 17 are formed on the internal walls of the cavity 16 of the metal mold 15 to keep a uniform interval between the coil 11 and the internal wall. The interval between the coil 11 and the internal wall of the cavity 16 of the metal mold 15 is kept uniform due to the spacing projections 17. Therefore, the resin molding 21 can be formed with a uniform thickness on the coil 11.

However, according to the conventional resin molding method for a coil of a transformer in the microwave oven, when the coil is inserted into the cavity 16 of the metal mold 15, the coil 11 can be damaged due to the spacing projections 17 which are projected from the internal wall of the cavity 16. When a transformer with the scraped coil is used for a long time, the damaged part of the coil 11 breaks easily, and accordingly, the transformer goes out of order. Moreover, the resin molding 21 has recesses 22 formed due to the presence of the spacing projections 17. The resin molding 21 at the recesses 22 may be formed with a thin thickness, or may not be formed at all. In the above cases, the coil 11 is easily damaged. When the coil 11 is damaged and exposed, the insulating status of the coil 11 of the transformer is deteriorated, and accordingly, sparks are generated while the transformer is operated. What is needed is a two step molding process where either an auxiliary spacing apparatus made of resin is first formed arount the coil before molding or the coil is twice molded, the first time the molded coil has projections and after the second resin molding, the projections of the first molding process are covered up.

SUMMARY OF THE INVENTION

The present invention has been developed to overcome the above problems of the related art, and accordingly it is an object of the present invention to provide a method for forming a resin molding for a coil of a transformer by which the coil is not damaged and the resin molding is formed with an uniform thickness.

The above object is accomplished by a method for forming a resin molding for a coil of a transformer according to the present invention, said method comprising: inserting a coil into an auxiliary apparatus for spacing; inserting the auxiliary spacing apparatus into a mold; and forming a resin molding for the auxiliary spacing apparatus with the coil by putting a resin into the mold.

The auxiliary spacing apparatus may be formed of the same resin used in the resin molding, or may be a different resin. The auxiliary spacing apparatus has a mesh shape so that the resin used in the resin molding makes enough contact with the coil.

The auxiliary spacing apparatus has preferably a plurality of projections formed on an external surface thereof for ensuring a thickness sufficient to electrically insulate the coil and emit the heat of the coil. Meanwhile, the coil can be directly wounded around the auxiliary spacing apparatus.

The above object is also accomplished by another method for forming a resin molding for a coil of the transformer according to the present invention, said method comprising: inserting a coil into a primary mold to form a spacing part on the coil; inserting the coil with the spacing part into a secondary mold; and forming a resin molding for the coil with the spacing part by putting a resin into the secondary mold.

The spacing part may be formed of the same resin used in the resin molding or may be different resin. The spacing part has projections with multiple stairs formed on the external surface thereof for preventing from being detached from the resin molding by the secondary mold.

BRIEF DESCRIPTION OF THE DRAWING

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
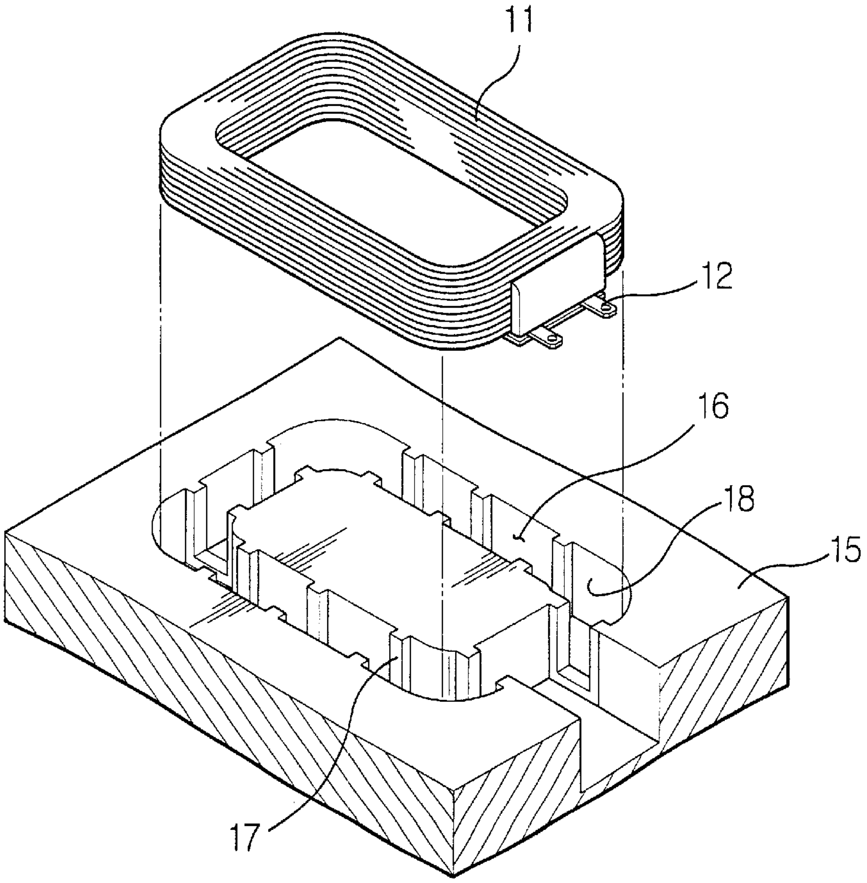
FIG. 1 is an analyzed perspective view for illustrating a method for forming a resin molding for a coil of the transformer in the related art.
Figure 2:
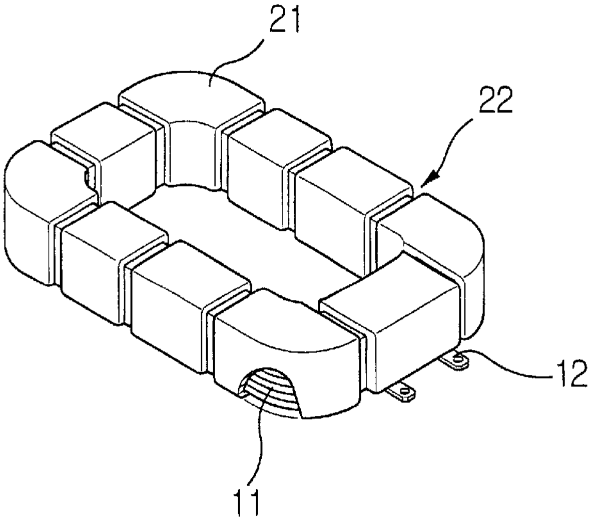
FIG. 2 is a perspective view for showing the coil covered with a resin molding formed by using the method of FIG. 1.
Figure 3:
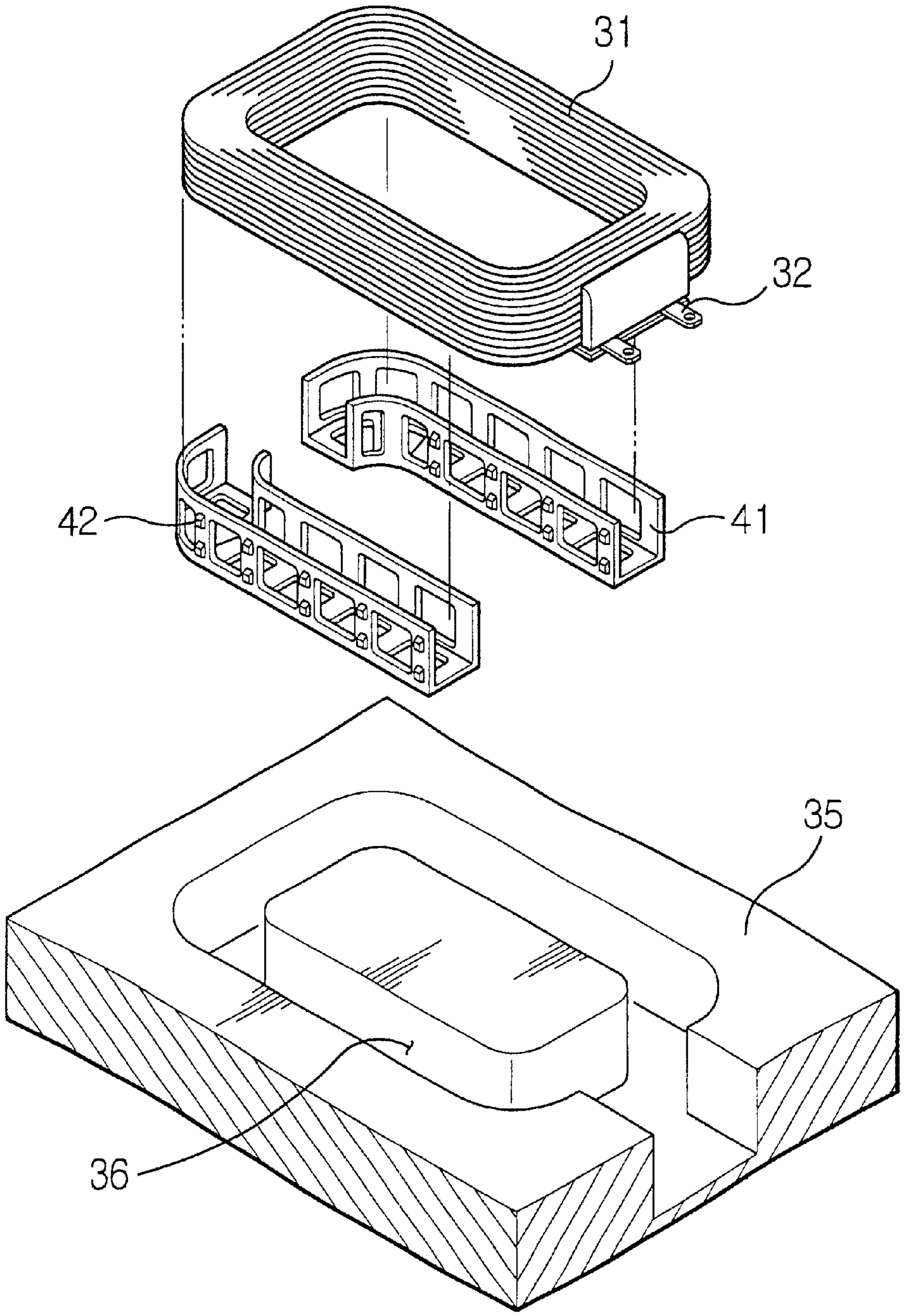
FIG. 3 is an analyzed perspective view for illustrating a method for forming a resin molding for a coil of the transformer according to a first preferred embodiment of the present invention.
Figure 4:
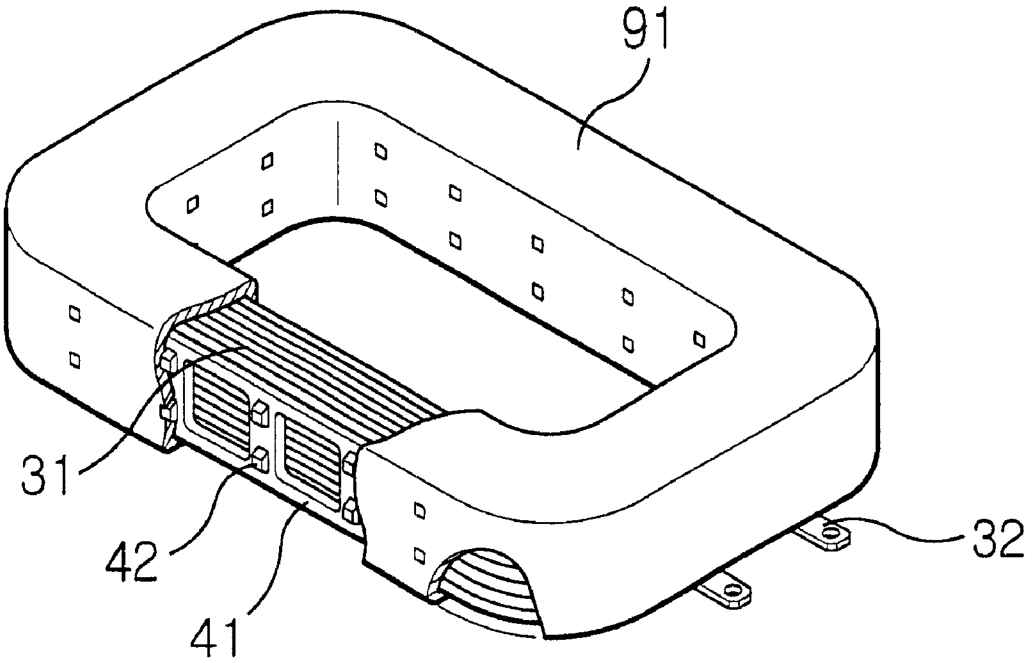
FIG. 4 is a perspective view for showing the coil covered with the resin molding formed by the method of FIG. 3.

A first preferred embodiment of the present invention will be described with FIG. 3 and FIG. 4. FIG. 3 is an analyzed perspective view for illustrating a method for forming a resin molding for a coil of the transformer according to a first preferred embodiment of the present invention. Referring to FIG. 3, a coil 31 is inserted into an auxiliary spacing apparatus 41 which is formed with a pair of sub-parts. The auxiliary spacing apparatus 41 with the coil 31 is inserted into a cavity 36 of a mold 35, and then a resin molding 91 is formed on the auxiliary spacing apparatus 41 with the coil 31 by putting a resin into the mold 35.

The auxiliary spacing apparatus 41 may be formed of the same resin used in the resin molding or may be formed of a different resin. The auxiliary spacing apparatus 41 has a mesh shape so that the resin used in the resin molding makes sufficient contact with the coil 31. The auxiliary spacing apparatus 41 has preferably a plurality of projections 42 on an external surface thereof for preventing the coil 31 from leaning to one side in the cavity 36 of the metal mold 35 and for ensuring an enough thickness to electrically insulate the coil 31 and to emit heat of the coil 31.

The projections 42 have edges of which ends are cut off or rounded off so that the auxiliary apparatus for spacing 41 can be inserted easily into the cavity 36 of the metal mold 35. Furthermore, the opening part of the auxiliary spacing apparatus 41 has edges of which ends are cut off or rounded off so that the coil 31 can be inserted easily into the auxiliary apparatus for spacing 41. A reference numeral 32 denotes connector for drawing out terminal ends from the coil 31. The connector 32 can be connected to the coil 11 for drawing out terminal ends from the coil 31 as shown in FIG. 3, or only two pieces of lines can be drawn out from the coil 31, which are not shown in the drawings. According to the method for forming the resin molding for the coil of the transformer of the first embodiment of the invention, the coil 31 is inserted into the cavity 36 of the metal mold 35 as the coil 31 is put in the auxiliary spacing apparatus 41 formed of resin, and thereby the coil 31 cannot be damaged when the coil 31 is inserted into the cavity 35. Furthermore, according to the method for forming the resin molding for the coil of the transformer, as shown in FIG. 4, the resin molding 91 has no recesses formed on the external surface thereof, and thereby the resin molding 91 with a uniform thickness can be obtained. When the auxiliary spacing apparatus 41 is formed of the same resin as that used for the resin molding, the auxiliary spacing apparatus 41 cannot be damaged and cannot be broken in insulation before the resin molding 91. Moreover, since the material interposed between the coil 31 and the resin molding 91 is the same resin as that used for the resin molding, the thermal conductivity decrease is prevented.

Figure 5:
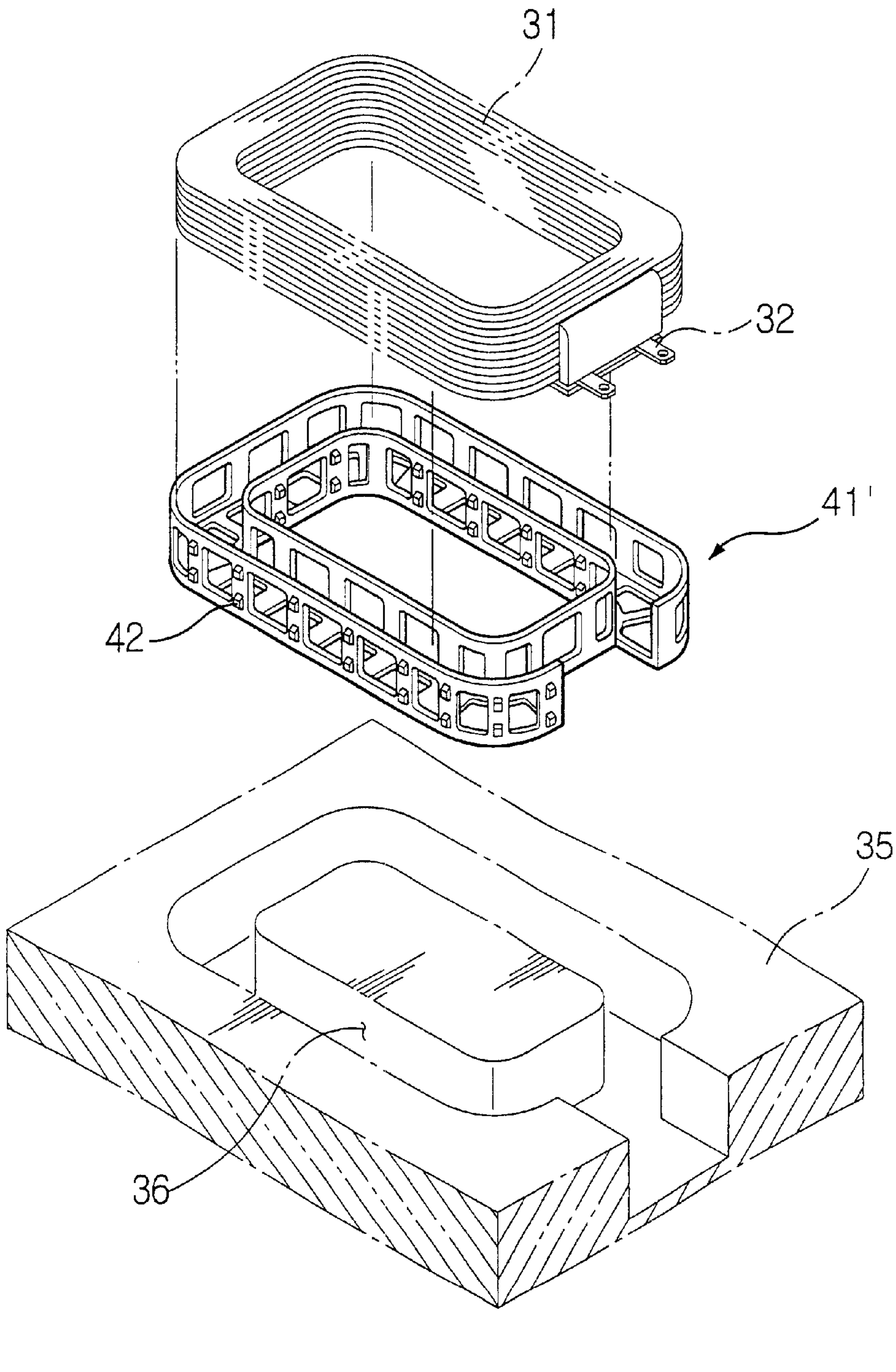
FIG. 5 is a perspective view for showing another auxiliary spacing apparatus used in a method for forming a resin molding for a coil according to a second preferred embodiment of the present invention, in which the auxiliary spacing apparatus is different from that used in FIG. 3.

Meanwhile, the second preferred embodiment of the present invention will be described with FIG. 5. Another auxiliary spacing apparatus 41' used in the method for forming the resin molding for the coil according to the second preferred embodiment of the present invention is shown in FIG. 5. The auxiliary spacing apparatus 41' of FIG. 5 is equivalent to that of FIG. 3 except that it is composed of one body while the auxiliary spacing apparatus 41 is composed of two bodies.

Figure 6:
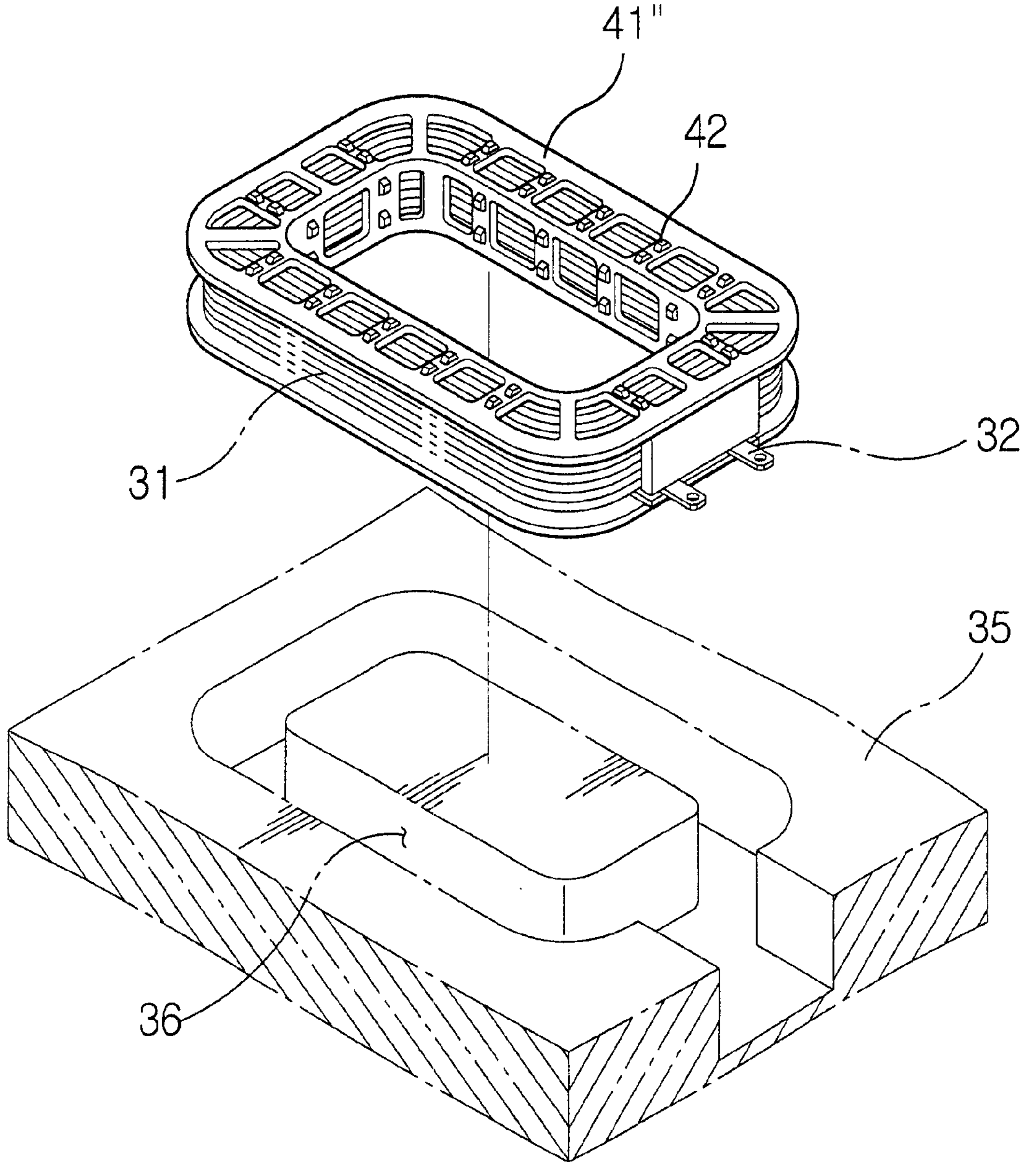
FIG. 6 is a perspective view for showing another auxiliary spacing apparatus used in a method for forming a resin molding for a coil according to a third preferred embodiment of the present invention, in which the auxiliary spacing apparatus is different from that used in FIG. 3 or FIG. 5.
Figure 7:
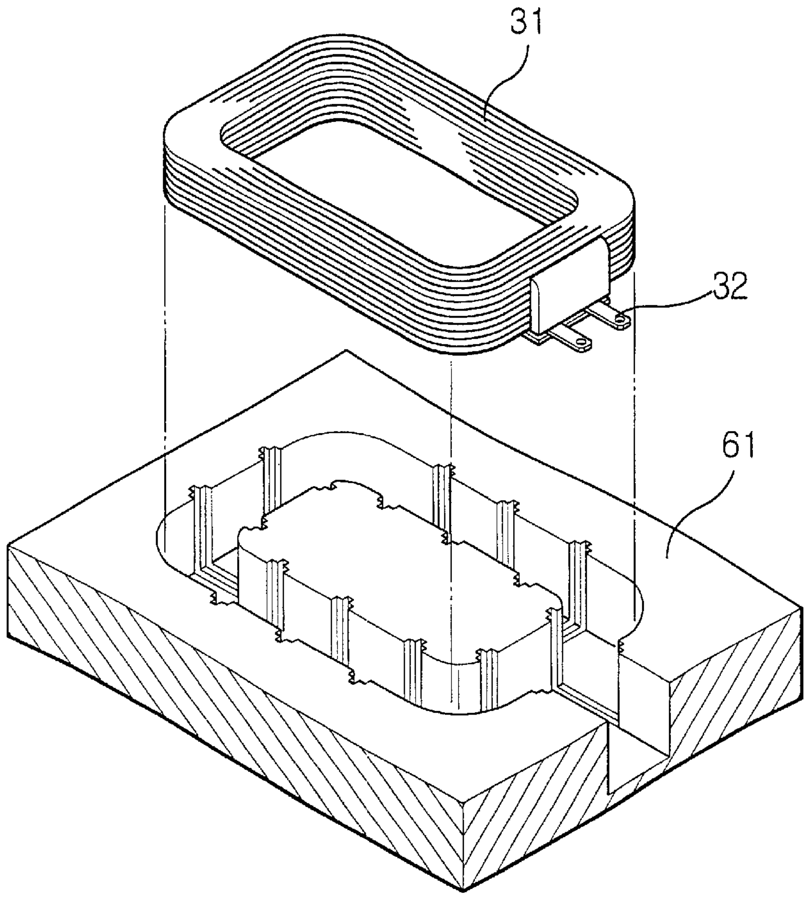
FIG. 7 is an analyzed perspective view for illustrating a step for inserting a coil into a primary mold in a method for forming a resin molding for a coil of a transformer according to a fourth preferred embodiment of the present invention.
Figure 8:
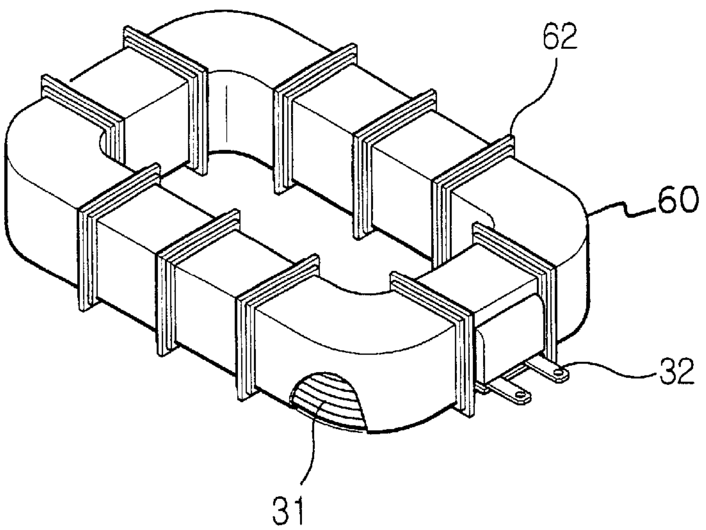
FIG. 8 is a perspective view for showing a spacing part with a coil formed by the method for forming the resin molding for the coil according to the fourth preferred embodiment of the present invention.
Figure 9:
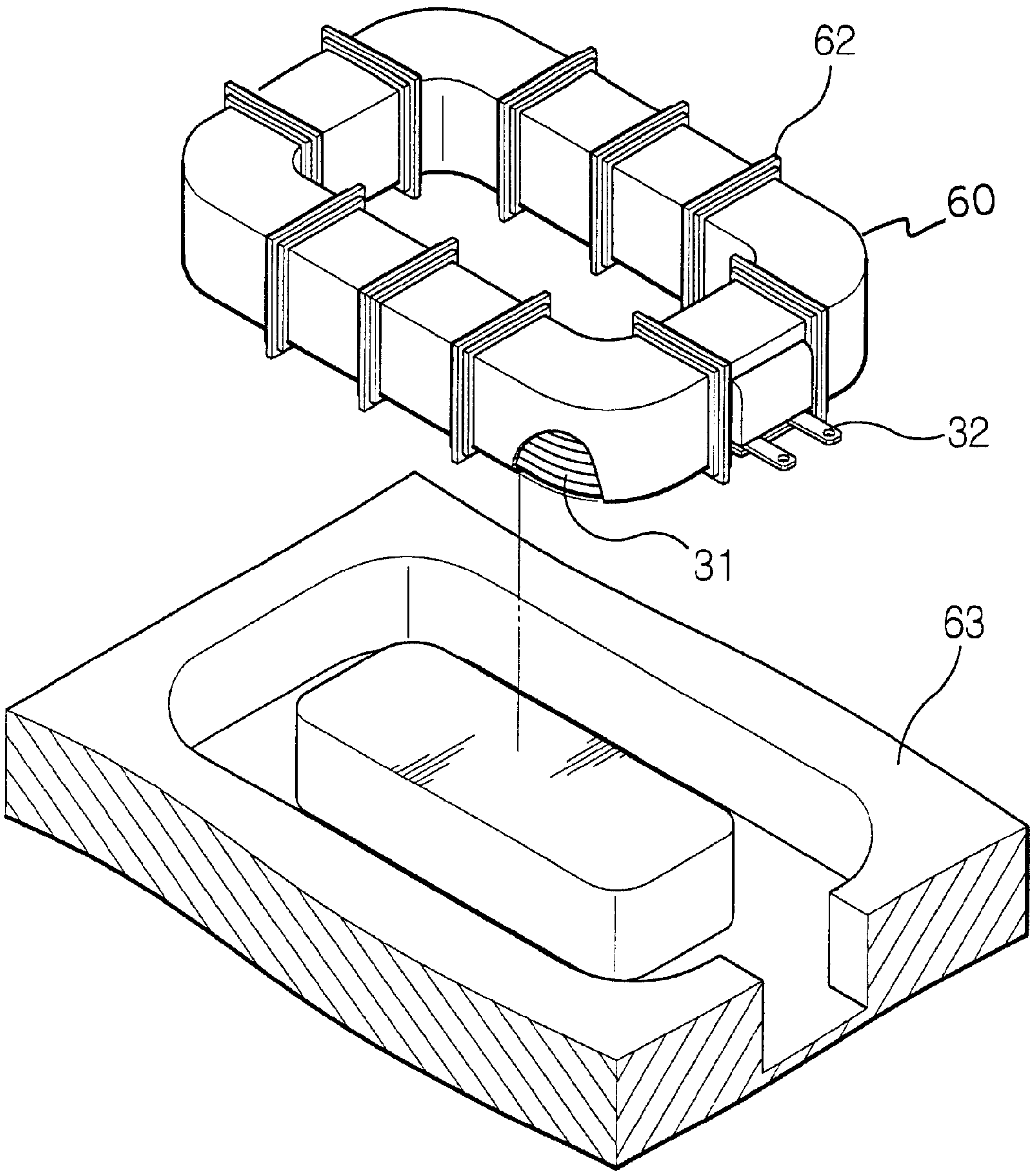
FIG. 9 is an analyzed perspective view for illustrating a step for inserting the spacing part with the coil into a secondary mold in the method for forming the resin molding on the spacing part with the coil according to the fourth preferred embodiment of the present invention.

The third preferred embodiment of the present invention will be described with FIG. 6. Another auxiliary spacing apparatus 41" used in the method for forming the resin molding for the coil according to the third preferred embodiment of the present invention is shown in FIG. 6. The auxiliary spacing apparatus 41" of FIG. 6 is equivalent to that of FIG. 5 except that the coil 31 which has been wounded is inserted into the auxiliary spacing apparatus 41' in FIG. 5, while the coil 31 is wounded directly around the auxiliary spacing apparatus 41" in FIG. 6.

The fourth preferred embodiment of the present invention will be described with FIG. 7 to FIG. 10. The coil 31 is inserted into a primary mold 61 (refer to FIG. 7) to form a spacing part 60 on the coil 31 (refer to FIG. 8). The coil 31 with the spacing part 60 is inserted into a secondary mold 63, and then a resin molding 91 is formed for the coil 31 with the spacing part 60 by putting a resin into the secondary mold 63. The spacing part 60 may be formed of the same resin used in the resin molding, or may be formed of a different resin. The spacing part 60 has projections 62 with multiple stairs formed on the external surface thereof for preventing from being detached from the resin molding 91. A reference numeral 32 denotes a connector for drawing out terminal ends from the coil 31. The connector 32 can be connected to the coil 31 for drawing out terminal ends from the coil 31 as shown in FIG. 3, or only two pieces of lines can be drawn out from the coil 31, although the same are not shown in the drawings.

Figure 10:
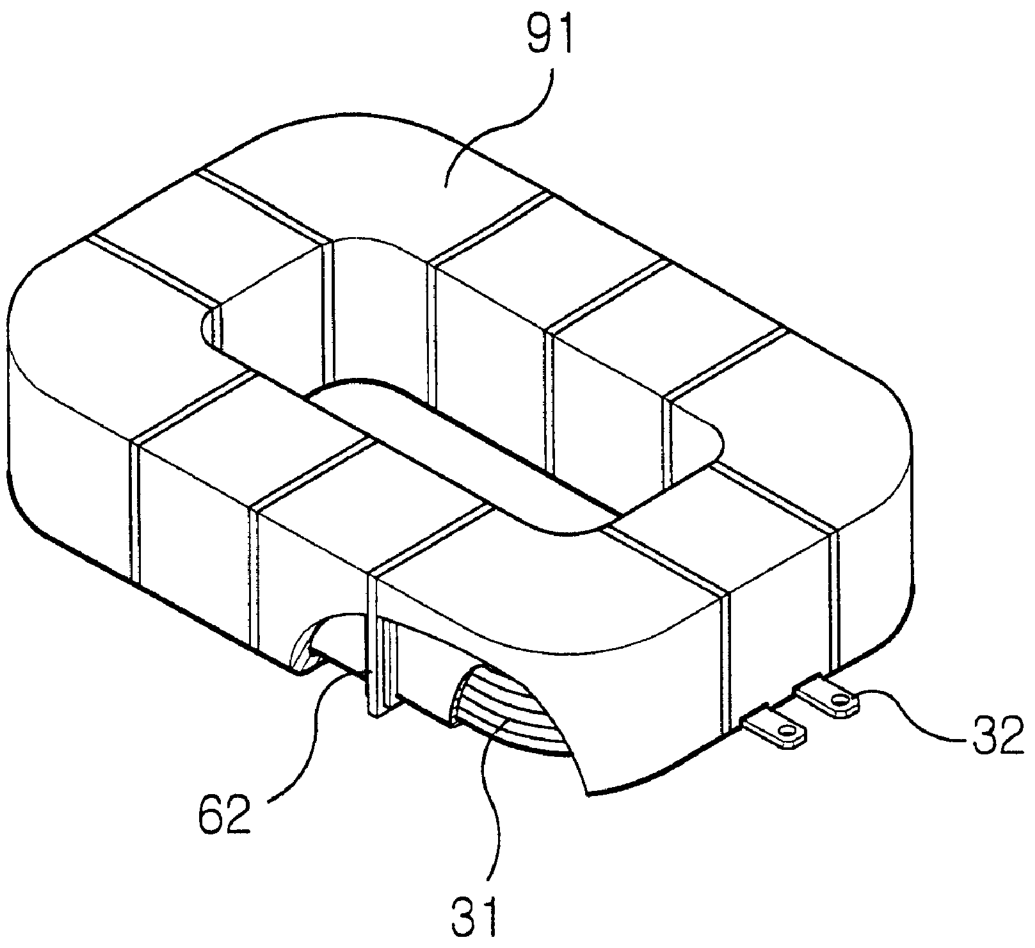
FIG. 10 is a perspective view for showing the coil covered with the final resin molding formed by the method for forming the resin molding for the coil according to the fourth preferred embodiment of the present invention.

According to the method for forming the resin molding for the coil of the transformer of the fourth embodiment of the invention, the coil 31 is inserted into the cavity of the metal mold 61 or 63 in which the metal molds 61 and 63 have no projections on their internal walls, and thereby the coil 31 cannot be damaged when the coil 31 is inserted into the cavity of the metal mold 61 or 63. Furthermore, according to the method for forming the resin molding for the coil of the transformer of the fourth embodiment of the invention, as shown in FIG. 10, the resin molding 91 has no recesses formed on the external surface thereof, and thereby the resin molding 91 with a uniform thickness can be obtained.

When the spacing part 60 is formed of the same resin as that used for the resin molding 91, the spacing part 60 cannot be damaged and cannot be broken in insulation before the resin molding 91. Moreover, since the material interposed between the coil 31 and the resin molding 91 is the same resin as that used for the resin molding, the thermal conductivity decrease is prevented. Therefore, according to the methods for forming the resin molding for the coil of the transformer of the embodiments of the invention, the coil is not damaged and a resin molding is formed with an uniform thickness.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. A method for providing electrical and mechanical protection for a coil winding, said method comprising the steps of:

inserting said coil winding into an auxiliary spacing apparatus having an essentially U-shaped cross-section comprising three sides, each side being perpendicular to each other, said auxiliary spacing apparatus having projections on all three sides of said essentially U-shape auxiliary apparatus;

inserting said auxiliary spacing apparatus containing said coil winding into a metal mold having a three-faceted essentially U-shaped cross-sections forming a circular or oval cutout in a surface of said metal mold, each of said projections on each of said three sides of said auxiliary spacing apparatus contacting respective ones of said three facets of said essentially U-shaped cross-sections of said cutout of said mold resulting in exterior surfaces of said coil winding being equidistant from surfaces of said cutout of said three-faceted metal mold; and injecting resin molding into said mold having said auxiliary spacing apparatus and said coil winding to form a uniform thickness insulation layer about said coil winding.

2. The method of claim 1, wherein said auxiliary spacing apparatus is made of a resin which is equal to that of said injected resin.

3. The method of claim 2, wherein said auxiliary spacing apparatus has a grid mesh shape, allowing said injected resin to make sufficient contact with said coil winding.

4. The method of claim 3, wherein said coil winding has an oval shape with a rectangular cross-section, said exterior surfaces of said coil having a top surface, a bottom surface, an inner surface and an outer surface, said auxiliary spacing apparatus contacting said coil winding on said coil winding's inner surface, said bottom surface and said outer surface.

5. The method of claim 4, wherein said injected resin makes contact with said top surface, said bottom surface, said inner surface and said outer surface of said coil winding.

6. The method of claim 1, said auxiliary spacing apparatus comprises two J-shaped pieces, each having said essentially U-shaped cross section.

7. The method of claim 1, said auxiliary spacing apparatus comprises an essentially oval-shaped piece having said essentially U-shaped cross-section to accommodate said cutout of said coil winding.

8. The method of claim 3, wherein said coil winding has an oval shape with a rectangular cross-section, said exterior surfaces of said coil having a top surface, a bottom surface, an inner surface and an outer surface, said auxiliary spacing apparatus contacting said coil winding on said coil winding's inner surface, said bottom surface and said top surface resulting in said insertion of said coil winding into said auxiliary spacing apparatus to comprise the step of winding said coil winding directly around said auxiliary spacing apparatus.

9. A method for providing a uniform electrical and mechanical insulation for a coil, comprising the steps of:

inserting a coil having a rectangular cross-section into a first mold made of metal and having a cutout of essentially a same size and shape as said coil, said cutout resulting in an inner wall, an outer wall, and a bottom wall of said cutout of said metal mold, each of these walls having a plurality of grooves formed therein;

injecting a first liquid resin into said metal mold containing said coil, said resin filling spaces between all sides of said coil and said walls of said cutout of said metal mold and filling said grooves formed within said metal mold;

allowing said resin to cool and solidify;

removing said coil coated with said resin on all sides of said coil from said first metal mold, said resin having a plurality of projections of resin encircling said resin covered coil formed by said plurality of grooves formed in said first metal mold;

inserting said resin covered coil into a second metal mold, said second metal mold having an oval cutout, said oval cutout accommodating said resin covered coil having said plurality of projections encircling said resin covered coil, said cutout of said second metal mold having a bottom surface, an inner surface, and an outer surface, said projections of said resin covered coil forming contact with each of said inner surface, said outer surface and said bottom surface of said cutout of said second metal mold;

injecting a second liquid resin into said second metal mold containing said resin covered coil comprising said plurality of encircling projections, said liquid resin being disposed between an outer surface of said resin covered coil and said bottom, inner, and outer surfaces of said second metal mold;

allowing said injected liquid resin to solidify; and removing said coil and said solidified resin from said second metal mold.

10. The method of claim 9, wherein a thickness of resin on said coil after removal from said second metal mold is uniform at all points of said coil.

11. The method of claim 10, wherein said plurality of projections encircling said resin being stepped in shape.

12. The method of claim 11, wherein said plurality of projections encircling said resin protruding equidistant from an outer surface of said first solidified resin.

13. The method of claim 12, wherein said first liquid resin is of the same material as said second liquid resin.

14. The method of claim 9, wherein said coil has electrical connectors extending outward from said coil, said electrical connectors never being coated by said first or said second liquid resin.

15. A method for providing electrical and mechanical protection for a coil winding, said method comprising the steps of:

providing a coil having an oval shape and a rectangular cross section, said coil being electrically connected to an electrical connector;

providing an spacing apparatus having a rectangular shaped cross section to accommodate said coil, said spacing apparatus having a plurality of projections protruding away from said rectangular shape;

inserting said coil into said spacing apparatus, a bottom side and an inner side and an outer side of said coil being in contact with said spacing apparatus, said projections being on opposite surfaces of said spacing apparatus than the surfaces of said spacing apparatus that contact said coil;

inserting said coil and spacing apparatus attached thereto into a metal mold having a bottom, an inner and an outer side, each of said projections of said spacing apparatus forming contact with said bottom, inner, and outer side of said metal mold;

injecting hot liquid resin into said metal mold containing said coil and said spacing apparatus, said liquid resin filling gaps between said coil and said spacing apparatus and said inner, outer, and bottom walls of said metal mold created by said projections of said spacing apparatus contacting said metal mold;

allowing said hot liquid resin to cool and solidify; and removing said coil coated with resin from said metal mold.

16. The method of claim 15 wherein said spacing apparatus and said resin being of the same material, resulting in a uniform thickness of insulation on said coil except where said electrical connections for said coil are disposed.

17. The method of claim 15, wherein said spacing apparatus is perforated by a plurality of holes allowing said hot liquid resin to contact said coil directly when in said metal mold.

18. The method of claim 15, wherein said spacing apparatus comprises two J-shaped pieces, each placed on different parts of said coil.

19. The method of claim 15, wherein said spacing apparatus is essentially oval in shape.

20. A method for providing electrical and mechanical protection for a coil winding, said method comprising the steps of:

providing a coil having an oval shape and a rectangular cross section, said coil being electrically connected to an electrical connector;

providing an spacing apparatus having a rectangular shaped cross section to accommodate said coil, said spacing apparatus having a plurality of projections protruding away from said rectangular shape;

winding said coil around said spacing apparatus, a bottom side and an inner side and an upper side of said coil being in contact with said spacing apparatus, said projections being on opposite surfaces of said spacing apparatus than the surfaces of said spacing apparatus that contact said coil;

inserting said coil and spacing apparatus attached thereto into a metal mold having a bottom, an inner and an outer side, each of said projections of said spacing apparatus forming contact with said bottom, inner, and outer side of said metal mold;

injecting hot liquid resin into said metal mold containing said coil and said spacing apparatus, said liquid resin filling gaps between said coil and said spacing apparatus and said inner, outer, and bottom walls of said metal mold created by said projections of said spacing apparatus contacting said metal mold;

allowing said hot liquid resin to cool and solidify; and removing said coil coated with resin from said metal mold.

21. The method of claim 20 wherein said spacing apparatus and said resin being of the same material, resulting in a uniform thickness of insulation on said coil except where said electrical connections for said coil are disposed.

22. The method of claim 20, wherein said spacing apparatus is perforated by a plurality of holes allowing said hot liquid resin to contact said coil directly when in said metal mold.

23. The method of claim 20, wherein said spacing apparatus is essentially oval in shape.

* * * * *